(12) United States Patent
Chun et al.

(10) Patent No.: US 12,471,755 B2
(45) Date of Patent: Nov. 18, 2025

(54) CATHETER HAVING VARIABLE FRONT END PART STRUCTURE

(71) Applicant: MEDICARETEC CO., LTD., Seoul (KR)

(72) Inventors: Han Yong Chun, Seoul (KR); Seong Il Kwon, Seoul (KR); Chun Woo Kim, Seoul (KR)

(73) Assignee: MEDICARETEC CO., LTD., Seoul (KR)

( * ) Notice: Subject to any disclaimer, the term of this patent is extended or adjusted under 35 U.S.C. 154(b) by 229 days.

(21) Appl. No.: 18/270,149

(22) PCT Filed: Dec. 29, 2021

(86) PCT No.: PCT/KR2021/020098
§ 371 (c)(1),
(2) Date: Jun. 28, 2023

(87) PCT Pub. No.: WO2022/146002
PCT Pub. Date: Jul. 7, 2022

(65) Prior Publication Data
US 2024/0057849 A1 Feb. 22, 2024

(30) Foreign Application Priority Data
Dec. 29, 2020 (KR) .......................... 10-2020-0185571

(51) Int. Cl.
*A61B 1/00* (2006.01)
*A61B 1/005* (2006.01)
(Continued)

(52) U.S. Cl.
CPC ............ *A61B 1/0008* (2013.01); *A61B 1/005* (2013.01); *A61B 1/018* (2013.01); *A61M 25/0023* (2013.01); *A61M 25/0082* (2013.01)

(58) Field of Classification Search
CPC ........ A61B 1/0008; A61B 1/005; A61B 1/018
See application file for complete search history.

(56) References Cited

U.S. PATENT DOCUMENTS 9,149,251 B2 * 10/2015 Steffen ................ A61B 17/3403
2017/0340308 A1 * 11/2017 Cermak .................... A61B 8/12

FOREIGN PATENT DOCUMENTS

| JP | 2004-512022 A | 4/2004 |
| JP | 2006-514565 A | 5/2006 |

(Continued)

*Primary Examiner* — Rochelle D Turchen
(74) *Attorney, Agent, or Firm* — Bridgeway IP Law Group, PLLC; Sang Ho Lee; Hyun Woo Shin

(57) ABSTRACT

A catheter having a variable front end structure includes: a tube having an insertion path passing therethrough in a longitudinal direction thereof and one or more first incised slits extending by a given length from the front end side thereof toward the rear end side thereof; an imaging part placed on top of the tube between the one or more first incised slits and aligned in a line with the insertion path on the front end of the insertion path; a front end part made of a flexible material and adapted to surround the outer peripheries of the front ends of the imaging part and the tube; and a tool inserted into the insertion path, wherein the front end part comprises a second incised slit formed at a position distant by a given distance from the front end side thereof toward the rear end side thereof and extending in a width direction thereof.

8 Claims, 9 Drawing Sheets

(51) Int. Cl.
     *A61B 1/018*         (2006.01)
     *A61M 25/00*       (2006.01)

(56) References Cited

FOREIGN PATENT DOCUMENTS

| JP | 2018-023840 A | 2/2018 |
|----|---------------|--------|
| KR | 10-2019-0012946 A | 2/2019 |
| KR | 10-2020-0097367 A | 8/2020 |

* cited by examiner

CATHETER HAVING VARIABLE FRONT END PART STRUCTURE

TECHNICAL FIELD

The present invention relates to a catheter having a variable front end structure, more specifically to a catheter having a variable front end structure that is capable of having a front end deformable in shape in such a way that a tool can move thereto.

BACKGROUND ART

Todays, many medical surgeries are performed with minimally invasive approach techniques having the advantages of smaller incisions, reduction in surgical complications, and shorter recovery time.

However, the minimally invasive surgery needs a medical device that is inserted into a human body through a small incision formed on the human body, observes a given surgical region in the human body, and delivers a drug for treating the tissues on the given region or a tool for performing surgery or treatment to the given region.

A catheter is one of the most general devices used for the minimally invasive surgery, and the catheter is a tube-shaped device that is inserted into an organ with a body cavity or lumen.

FIG. 1 is a schematic perspective view showing a conventional catheter 1. Referring to FIG. 1, the conventional catheter 1 includes a catheter tube 10, a camera 20, an optical fiber 30, and a path 40.

The catheter tube 10 is a hollow tube that includes other components at the inside thereof to surround them. For example, the camera 20 and the path 40 are placed parallel to each other inside the catheter tube 10. If the catheter 1 enters the body, the image/video of the interior of the human body can be checked through the camera 20 located on the front end of the catheter 1, and after the catheter 1 has entered the body, a drug or tool is inserted through the path 40 whose interior is empty, while a target region is being observed through the camera 20, to perform treatment or surgery.

As shown in FIG. 1, in the case of the conventional catheter 1, the camera 20 and the path 40 are placed parallel to each other inside the catheter tube 10, and accordingly, a diameter of the catheter tube 10 is determined as a size including both of the camera 20 and the path 40. It is of course good that the sizes of the camera 20 and the path 40 are big to improve a quality of image and apply various types of tools, but the diameter of the catheter tube 10 has no choice but to be reduced to a given size or under according to the characteristics of the body structure into which the catheter is inserted.

In the conventional catheter structure, the space of the catheter tube 10 whose diameter is limited is occupied by the camera 20 and the path 40, and accordingly, trade-off exists between a quality of image of the camera 20 and an available tool size in the path 40, thereby failing to improve the performance of both of the camera 20 and the path 40.

To solve the problems as mentioned above, the inventors have developed a catheter having a variable front end structure, which is disclosed in Korean Patent Application Laid-open No. 10-2020-0097367.

Referring to FIG. 2 showing the conventional catheter having a variable front end structure, the catheter 2 includes a camera 60, a support part 61 having a slant surface at the rear end thereof and supporting the camera 60, a path 70 disposed behind the support part 61 and having a slant surface at the front end thereof, and a catheter tube 50 made of a flexible material and surrounding the outer peripheries of the support part 61 and the path 70. When the catheter is inserted, the support part 61 and the path 70 are located in a horizontal direction with respect to each other (See FIG. 2a), and if an external force is applied in a direction where the path 70 moves forward after the catheter has been inserted, the support part 61 is pushed upward and lifted up, so that while a surgery/treatment region is being observed through the camera 60, surgery/treatment are performed using a tool inserted into the path 70. Accordingly, the catheter can be inserted into the body with a minimum diameter, thereby advantageously making it possible to perform the surgery/treatment ensuring a smaller surgical scar.

According to the conventional catheter structure, however, in the process where the path 70 pushes the support part 61 upward, an imaging direction of the camera 60 supported against the support part 61 is not parallel to the moving direction of the tool. In the case where the path 70 pushes to lift up the support part 61, the flexible catheter tube 50 is increased in diameter so that a restoring force in a direction of reducing the diameter of the catheter tube 50 is applied to the support part 61 and even to the wire connected to the camera 60 (See FIGS. 3 and 4).

In the case where the imaging direction of the camera 60 is not parallel to the moving direction of the tool, it is difficult that the surgery/treatment region where the surgery/treatment are performed through the tool cannot be accurately observed through the camera 60, and therefore, there is a definite need to develop a new catheter capable of solving the above-mentioned problems in a minimally invasive surgery.

DISCLOSURE

Technical Problem

Accordingly, the present invention has been made in view of the above-mentioned problems occurring in the related art, and it is an object of the present invention to provide a catheter having a variable front end structure that is capable of being minimized in diameter when inserted into the body, and after the insertion, the front end portion thereof is changed in shape to thus expand the cross section thereof, thereby improving a quality of image and enabling a tool to be moved therein.

It is another object of the present invention to provide a catheter having a variable front end structure that is configured to have a guide groove formed on a tube to guide a signal wire, thereby minimizing the application of the restoring force of a front end part to the signal wire, so that even if a tool is inserted, the imaging direction of an imaging part is placed parallel to the direction toward which the front end of an insertion path is oriented.

It is yet another object of the present invention to provide a catheter having a variable front end structure that is configured to have a second incised slit formed on a front end part, thereby minimizing the application of the restoring force of the front end part to an imaging part and a signal wire, so that even if a tool is inserted, the imaging direction of an imaging part is placed parallel to the direction toward which the front end of an insertion path is oriented.

Technical Solution

To accomplish the above-mentioned objects, according to an aspect of the present invention, a catheter may include: a tube 110 having an insertion path 111 passing therethrough in a longitudinal direction thereof and one or more first incised slits 112 extending by a given length from the front end side thereof toward the rear end side thereof; an imaging part 120 placed on top of the tube 110 between the one or more first incised slits 112 and aligned in a line with the insertion path 111 on the front end of the insertion path 111; a front end part 130 made of a flexible material and adapted to surround the outer peripheries of the front ends of the imaging part 120 and the tube 110; and a tool 140 inserted into the insertion path 111, wherein the front end part may include a second incised slit 131 formed at a position distant by a given distance from the front end side thereof toward the rear end side thereof and extending in a width direction thereof.

According to the present invention, the tube 110 may include first incised slits 112a and 112b as one or more first incised slits 112, and the first incised slits 112a and 112b may be spaced apart from each other by a given angle along the circumferential direction of the tube 110 with respect to a top center axis of the cross section of the tube 110.

According to the present invention, the given distance of the second incised slit 131 distant from the front end side of the front end part 130 may be proportional to a length of the imaging part 120.

According to the present invention, the given distance of the second incised slit 131 distant from the front end side of the front end part 130 may be equal to or longer than the length of the imaging part 120.

According to the present invention, the catheter may further include a signal wire 121 extending from the rear end side of the imaging part 120 in the longitudinal direction of the tube 110 to supply the power for operating the imaging part 120 and a guide groove 113 concavely formed on top of the tube 110 between the one or more first incised slits 112, on which the imaging part 120 is placed, to extend in the longitudinal direction of the tube 110.

According to the present invention, the catheter may further include a support part 150 located between the top of the tube 110 on which the imaging part 120 is placed and the imaging part 120 to support the imaging part 120.

According to the present invention, the insertion path 111 and the imaging part 120 may be placed on the same line in a horizontal direction with respect to each other, and if the tool 140 is inserted into the insertion path 111, the imaging part 120 may move in a vertical direction with respect to the horizontal direction through the tool 140, so that the imaging part 120 and the insertion path 111 may be placed parallel to each other in a diameter direction of the tube 110.

According to the present invention, if the tool 140 is inserted into the insertion path 111, the imaging part 120 and the insertion path 111 may be placed parallel to each other in the diameter direction of the tube 110, while the direction toward which the imaging part 120 is oriented is being parallel to the direction toward which the front end of the insertion path 111 is oriented.

Advantageous Effects of the Invention

According to the present invention, the catheter is minimized in diameter when inserted into the body, and after the insertion, the front end portion thereof is changed in shape to thus expand the cross section thereof, thereby improving a quality of image and enabling the tool to be moved therein.

Further, the catheter according to the present invention is minimized in diameter when inserted into the body, so that it is possible to enter narrow paths (e.g., spinal epidural space, ureter, the middle ear, and the like).

Furthermore, the catheter according to the present invention allows the imaging part having the similar size to the diameter thereof to be located at the inside thereof, thereby improving the quality of image/video, and further, the catheter according to the present invention allows the insertion path having the similar size to the diameter thereof to be formed therein, thereby making it possible to insert the tool having a relatively large size thereinto. As a result, the medical catheter, which is applicable to various fields such as neurosurgery, otorhinolaryngology, and the like, can be ultimately improved in performance.

In addition, the catheter according to the present invention is configured to have the guide groove formed on the tube to guide the signal wire, and accordingly, the application of the restoring force of the front end part to the signal wire is minimized, so that even if the tool is inserted, the imaging direction of the imaging part is placed parallel to the direction toward which the front end of the insertion path is oriented.

Further, the catheter according to the present invention is configured to have the second incised slit formed on the front end part, and accordingly, the application of the restoring force of the front end part to the imaging part and the signal wire is minimized, so that even if the tool is inserted, the imaging direction of the imaging part is placed parallel to the direction toward which the front end of the insertion path is oriented.

BRIEF DESCRIPTION OF DRAWINGS

FIGS. 7 to 10 are perspective views showing operations of the catheter having a variable front end structure according to the present invention, wherein FIG. 7 shows a state just after a tool is inserted into an insertion path of the catheter, FIG. 8 shows a state where an imaging part is lifted up after the tool has been more inserted into the front side of the catheter, FIG. 9 shows a state where the imaging part is completely lifted up after the tool has been more inserted into the front side of the catheter, and FIG. 10 shows a state where the imaging part and a tube are surrounded by the front end part.

BEST MODE FOR DISCLOSURE

Figure 1:
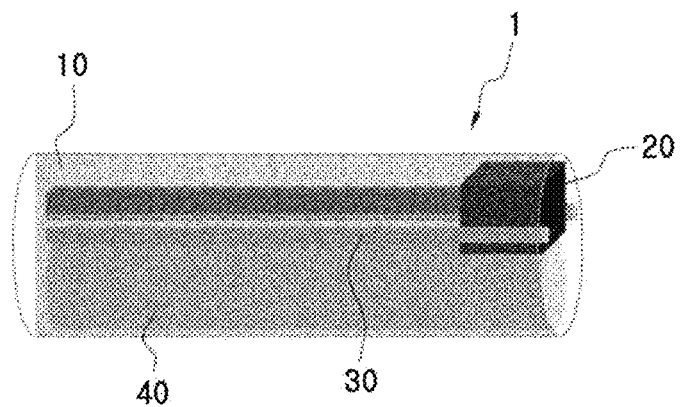
FIG. 1 is a schematic perspective view showing a conventional catheter.
Figure 2:
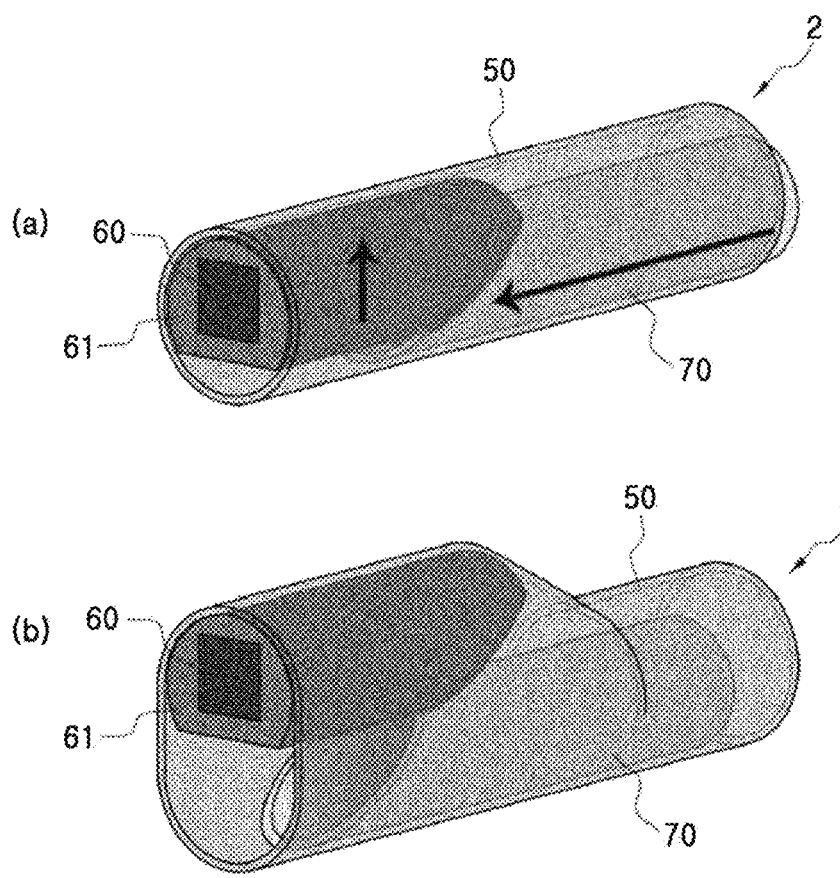
FIG. 2 is a perspective view showing a conventional catheter having a variable front end structure.

According to the present invention, a catheter having a variable front end structure includes: a tube 110 having an insertion path 111 passing therethrough in a longitudinal direction thereof and one or more first incised slits 112 extending by a given length from the front end side thereof toward the rear end side thereof; an imaging part 120 placed on top of the tube 110 between the one or more first incised slits 112 and aligned in a line with the insertion path 111 on the front end of the insertion path 111; a front end part 130 made of a flexible material and adapted to surround the outer peripheries of the front ends of the imaging part 120 and the tube 110; and a tool 140 inserted into the insertion path 111, wherein the front end part 130 includes a second incised slit 131 formed at a position distant by a given distance from the front end side thereof toward the rear end side thereof and extending in a width direction thereof.

Mode for Disclosure

In some cases, well-known structures and devices may be omitted to avoid the spirit of the invention from being obscure, or main functions of the structures and devices may be suggested to the form of block diagrams.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise. In the description, when it is said that one portion is described as "includes" any component, one element further may include other components unless no specific description is suggested.

If it is determined that the detailed explanation on the well-known technology related to the present invention makes the scope of the present invention not clear, the explanation will be avoided for the brevity of the description. Further, the terms as will be discussed later are defined in accordance with the functions of the present invention, but they may be varied under the intention or regulation of a user or operator. Therefore, they should be defined on the basis of the whole scope of the present invention.

Hereinafter, the present invention will be explained in detail with reference to the attached drawings.

Referring to FIGS. 5 to 10, a catheter 100 according to the present invention includes a tube 110, an imaging part 120, a front end part 130, a tool 140, and a support part 150.

The tube 110 is cylindrical and has an insertion path 111 passing therethrough in a longitudinal direction thereof. The insertion path 111 is formed in the entire longitudinal direction of the tube 110, and along the insertion path 111, the tool 140 as will be discussed later is inserted into the tube 110.

Figure 11:
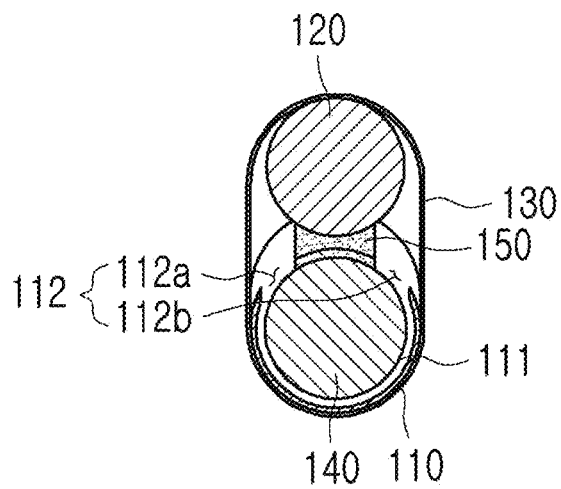
FIG. 11 is a sectional view taken along the line A-A' of FIG. 10.
Figure 12:
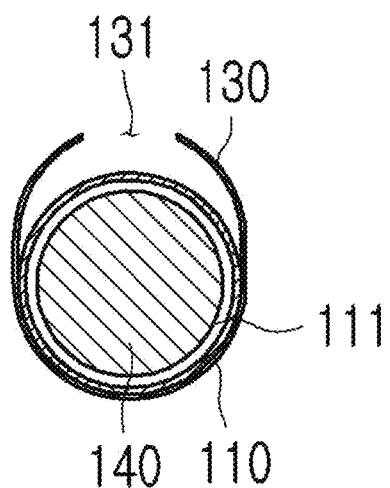
FIG. 12 is a sectional view taken along the line B-B' of FIG. 10.
Figure 13:
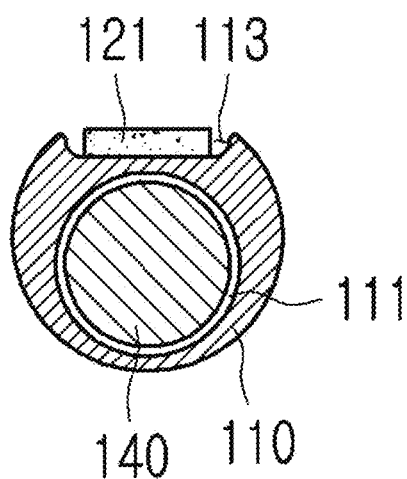
FIG. 13 is a sectional view taken along the line C-C' of FIG. 9.

The tube 110 has a first incised slit 112 extending by a given length from the front end thereof toward the rear end thereof. As shown in FIG. 11, the first incised slit 112 consists of two first incised slits 112a and 112b, but two or more incised slits may be formed, without being limited thereto.

The first incised slits 112a and 112b are spaced apart from each other by a given angle along the circumferential direction of the tube 110 with respect to a top center axis of the cross section of the tube 110. Further, the imaging part 120 is placed on top of the tube 110 between the first incised slits 112a and 112b.

The imaging part 120 is located on the front end of the tube 110 to image a given position in a direction toward which the front end thereof is oriented. For example, the imaging part 120 may become a camera.

As mentioned above, the imaging part 120 is placed on top of the tube 110 between the first incised slits 112a and 112b and is positioned on the same line in a horizontal direction with respect to the insertion path 111. After that, if the tool 140 is inserted into the insertion path 111 and moves forward, the imaging part 120 is placed parallel to the insertion path 111, which will be discussed in detail later.

The imaging part 120 has a signal wire 121 disposed on the rear end thereof, and the signal wire 121 is connected to the imaging part 120 to supply the power for operating the imaging part 120. Further, the signal wire 121 serves as a communication line for transmitting an image signal generated from the imaging part 120 to thus transmit and receive signals to and from a PCB (not shown) connected thereto. The PCB (not shown) processes the image signal received from the imaging part 120 through a given method and transmits the processed image signal to an output part (not shown) through a separate output port, so that the image captured by the imaging part 120 can be recognized with the naked eye of a surgeon.

For example, the signal wire 121 has given width and thickness, especially a cross section of a square, more especially a cross section of a rectangle.

The tube 110 has a guide groove 113 formed on top thereof to guidedly place the signal wire 121 therealong.

The guide groove 113 is concavely formed in the longitudinal direction of the tube 110 on a portion of the tube 110 at which the imaging part 120 is placed, that is, the portion of the tube 110 between the first incised slits 112a and 112b.

The cross section of the guide groove 113 desirably has the same shape as the signal wire 121, and in specific, it is desirable that the guide groove 113 have the same width as the signal wire 121.

Through the formation of the guide groove 113, the signal wire 121 is guidedly movable along the guide groove 113.

If the tool 140 is inserted into the insertion path 111 and placed parallel to the imaging part 120 at the front end of the catheter 100, a restoring force of the front end part 130 is applied to the signal wire 121 as well as the imaging part 120.

As the imaging part 120 is located at the outside of the tube 110, the signal wire 121 connected to the imaging part 120 is also located at the outside of the tube 110. In the case of the conventional catheter 2 with no guide groove 113 on the tube 110, the restoring force of the front end part 130 is applied to the signal wire 121, so that since the imaging part 120 is connected to the signal wire 121, a direction (that is, a direction imaged by the imaging part) toward which the imaging part 120 is oriented is not parallel to a direction toward which the front end of the insertion path 111 is oriented.

According to the present invention, contrarily, the guide groove 113 is formed on top of the tube 110, and the signal wire 121 is inserted into the guide groove 113, so that the restoring force as will be discussed later of the front end part 130 is minimizedly applied to the signal wire 121. Accordingly, the direction toward which the imaging part 120 is oriented is parallel to the direction toward which the front end of the insertion path 111 is oriented.

Figure 10:
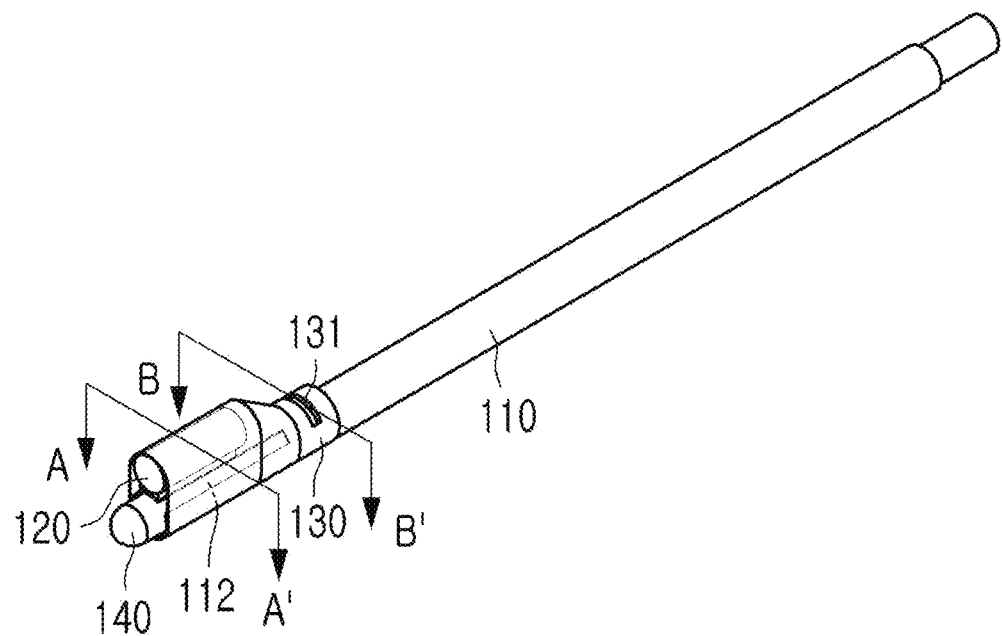

The front end part 130 is configured to surround the outer peripheries of the front ends of the imaging part 120 and the tube 110. As shown in FIG. 10, the front end part 130 is adapted to entirely surround the outer peripheries of the front ends of the imaging part 120 and the tube 110. According to another embodiment of the present invention, the front end part 130 may surround the outer periphery of tube 110 in the entire length of the tube 110, while surrounding the outer peripheries of the front ends of the imaging part 120 and the tube 110.

The front end part 130 is made of a flexible material, and in this case, the flexible material is a material that is changed in shape if an external force is applied thereto and is returned to its original shape through a restoring force if the external force disappears.

The front end part 130 is made of the flexible material, so that when the tool 140 is inserted into the insertion path 111, the imaging part 120 has relative movement with respect to the tube 110.

The above-mentioned operations will be explained in detail with reference to FIGS. 7 to 10.

Before the tool 140 is inserted into the insertion path 111, the imaging part 120 and the insertion path 111 are alignedly positioned on the same line in the horizontal direction (See FIG. 7) with respect to each other.

Figure 8:
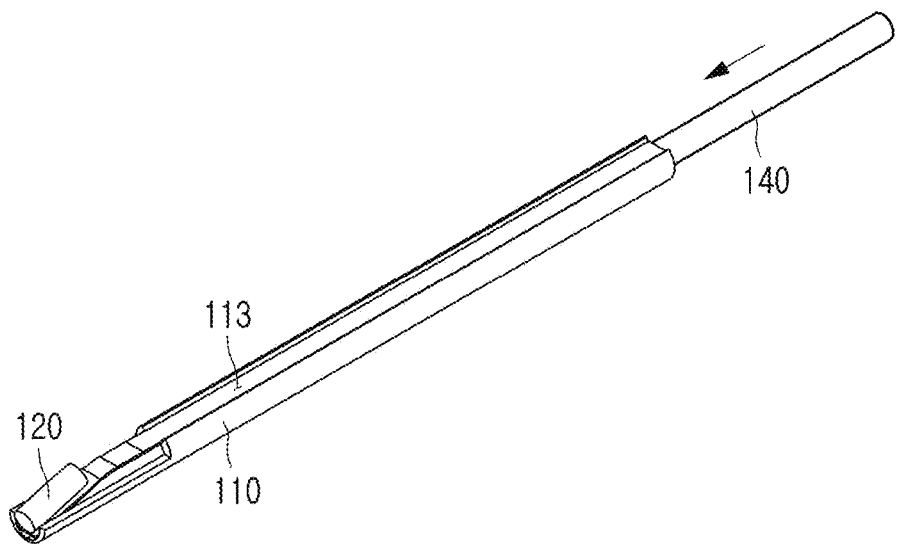

If the tool 140 is inserted into the insertion path 111, the tool 140 pushes to lift up the portion of the tube 110 on which the imaging part 120 is placed (See FIG. 8). In this case, since the front end part 130, which surrounds the tube 110 and the imaging part 120, is made of the flexible material, it may be changed in shape while the imaging part 120 is being pushed and lifted up.

Figure 9:
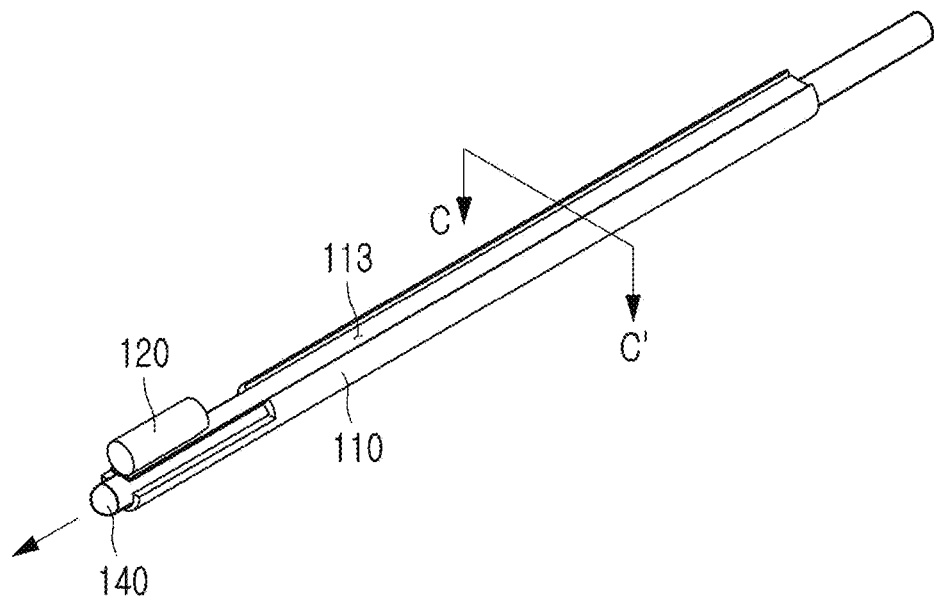

If the tool 140 is deeply inserted into the front side of the tube 110, the portion of the tube 110 on which the imaging part 120 is placed is completely lifted up to cause the imaging part 120 and the tool 140 are placed parallel to each other (See FIG. 9). In this case, the front end part 130 is expanded to the maximum (See FIG. 10).

As shown in FIG. 10, the front end part 130 is expanded to the maximum, and the restoring force of the front end part 130 is exerted to the maximum. The restoring force of the front end part 130 is applied to the imaging part 120 and the signal wire 121 located at the inside of the front end part 130 in various directions.

In specific, the restoring force is applied to the width direction of the tube 110 and to the orthogonal direction slant to a given angle with respect to the width direction.

Figure 3:
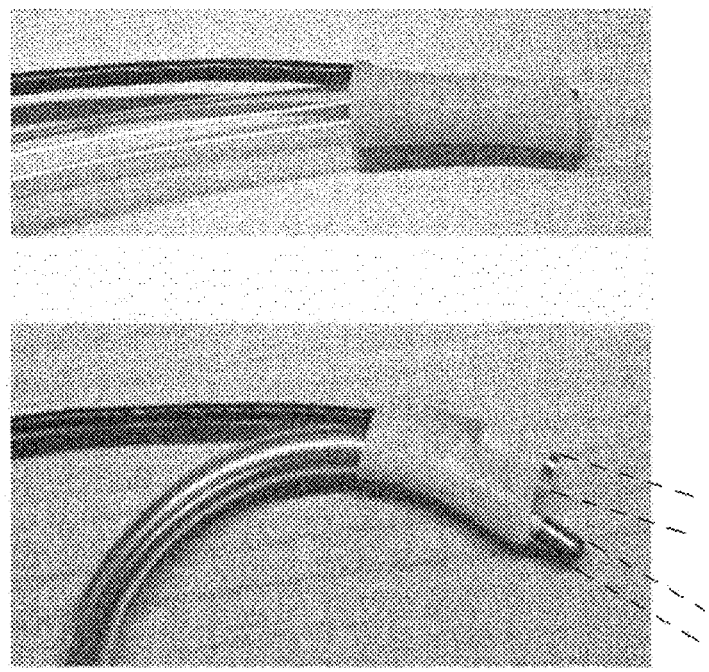
FIGS. 3 and 4 are views showing problems occurring on the conventional catheter.
Figure 4:
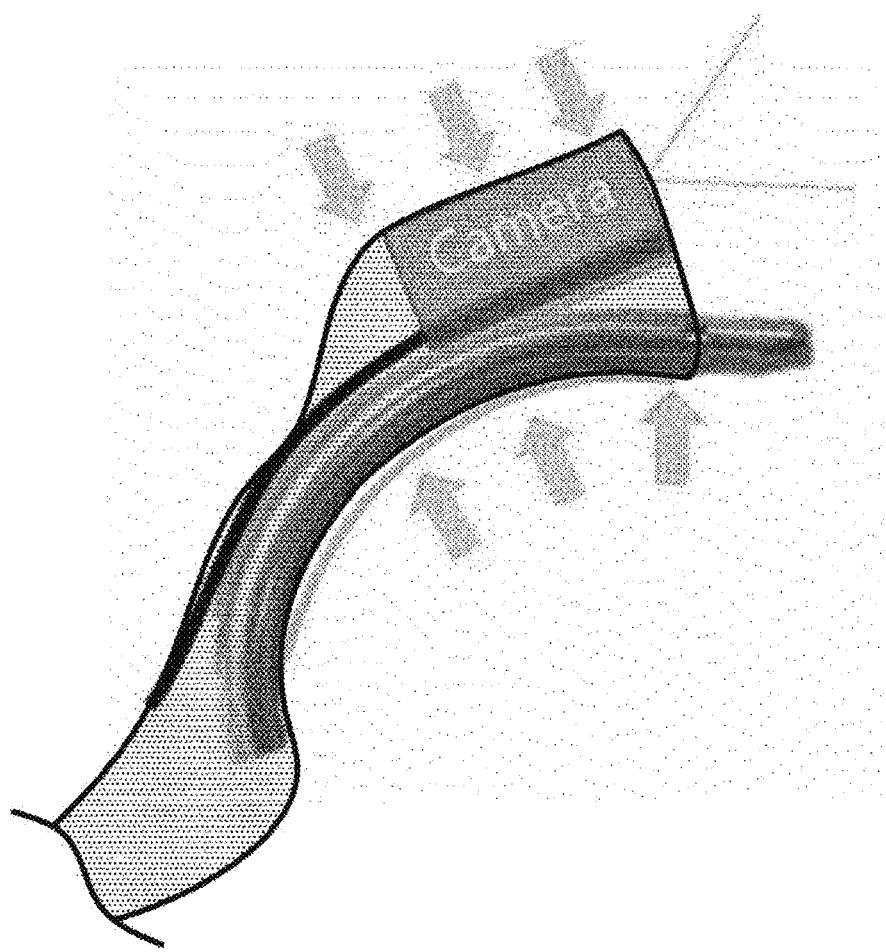
Figure 5:
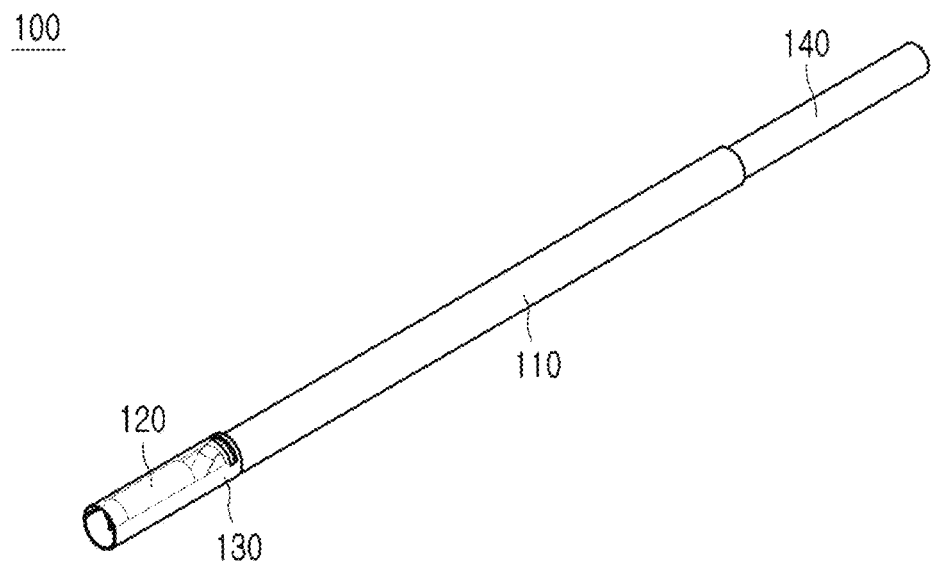
FIG. 5 is a perspective view showing a catheter having a variable front end structure according to the present invention.
Figure 6:
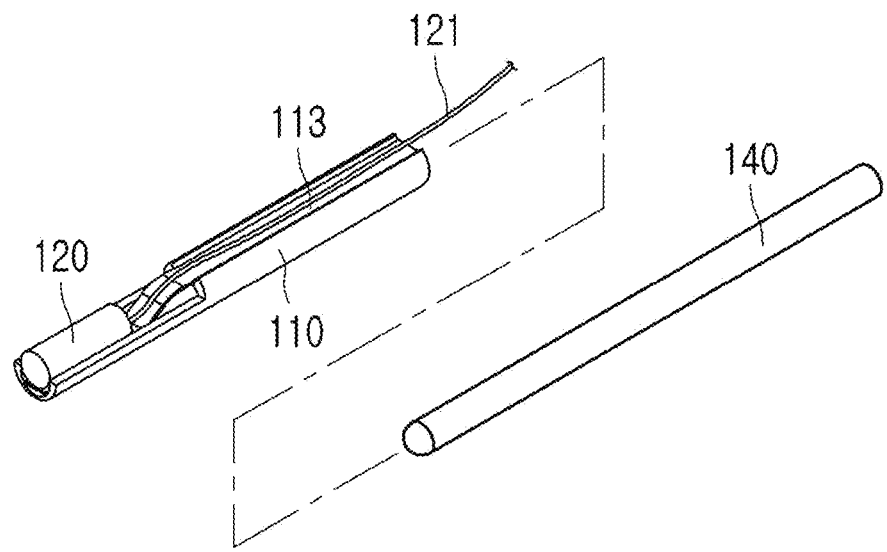
FIG. 6 is an exploded perspective view showing the catheter of FIG. 5.
Figure 7:
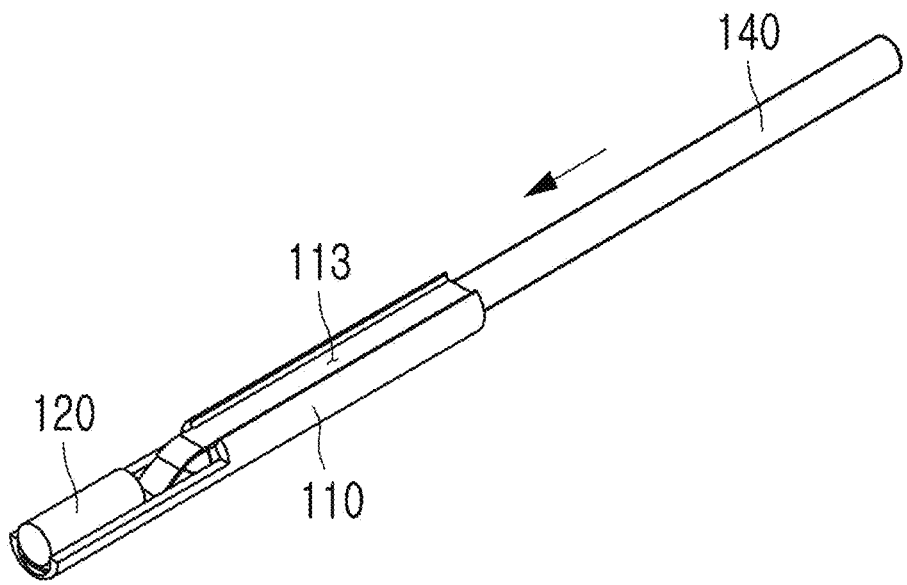

In this case, as shown in FIGS. 3 and 4, the imaging part 120 is oriented toward a different direction not parallel to the direction of the insertion path 111. This causes the imaging part 120 to fail to image the tool 130 inserted into the insertion path 111.

According to the present invention, the above-mentioned problem is solved to provide a second incised slit 131 on the front end part 130.

The second incised slit 131 is incised at a position distant by a given distance from the front end side of the front end part 130 toward the rear end side thereof in a width direction of the front end part 130.

The given distance of the second incised slit 131 distant from the front end side of the front end part 130 is proportional to a length of the imaging part 120, and in specific, it is equal to the length of the imaging part 120.

As the second incised slit 131 is formed on the front end part 130, the application of the restoring force of the front end part 130 in the orthogonal direction can be minimized, and accordingly, even if the imaging part 120 and the tool 140 are placed parallel to each other, the direction toward which the imaging part 120 is oriented and the direction toward which the tool 140 is oriented are parallel to each other. That is, it is possible that the imaging part 120 captures an image of a given region where the surgery/treatment are performed by the tool 140.

The tool 140 is inserted into the insertion path 111 of the tube 110 to perform the surgery/treatment.

Figure 14:
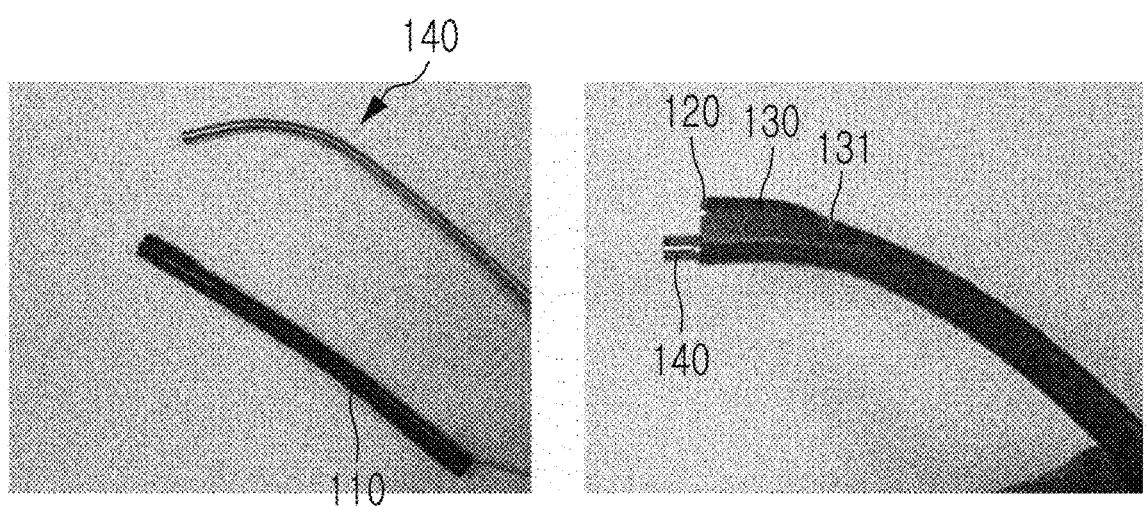
FIGS. 14 and 15 are views showing states before and after a tool whose front end is bent is inserted into the catheter according to the present invention.
Figure 15:
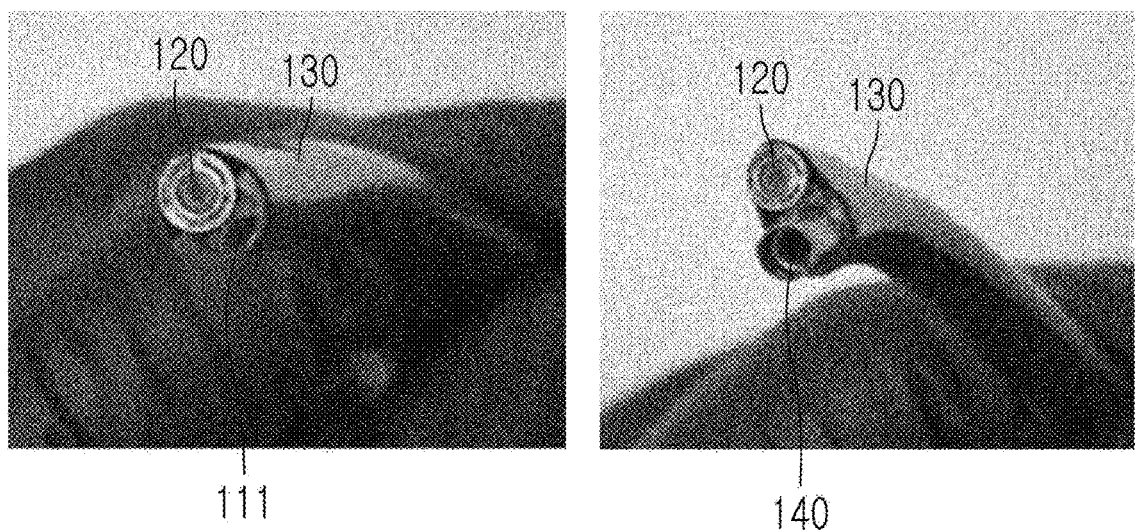

For example, the tool 140 includes forceps, a needle, and the like. The tool 140 has a straight line shape, but it may be bent to a given angle (See FIGS. 14 and 15).

According to another embodiment of the present invention, a straight line or bent hollow body for towing a tool for performing surgery/treatment, not the tool 140 directly performing the surgery/treatment, may be inserted into the insertion path 111. If the hollow body is inserted, the tool 140 for performing the surgery/treatment is inserted into the hollow body.

The support part 150 is located between the portion of the tube 110 on which the imaging part 120 is placed and the imaging part 120 to support the imaging part 120. Accordingly, the support part 150 serves to fix the imaging part 120 to the tube 110 so that the imaging part 120 is fixed to the tube 110. According to another embodiment of the present invention, further, it is possible that the imaging part 120 is placed just on top of the tube 110, without any support part 150.

Next, a method for using the catheter 100 according to the present invention will be explained in detail.

First, an incision is formed on a body region where the catheter 100 is inserted.

Next, the catheter 100 is inserted to pass through the incision. In this case, the imaging part 120 and the insertion path 111 are aligned in a line, so that the diameter of the catheter 100 can be minimized. Accordingly, it is possible that the catheter 100 is inserted with the minimal incision size.

After that, a given position as a surgery/treatment subject is determined through the imaging part 120, and then, the catheter 100 moves forward up to the corresponding position.

If the catheter 100 approaches the given position as the surgery/treatment subject, the tool 140 is inserted into the insertion path 111 from the rear end side of the catheter 100. If the surgery/treatment subject is the paranasal sinuses, the tool whose front end is bent is inserted.

If the tool 140 is inserted to get close to the imaging part 120, the imaging part 120 is lifted up toward the diameter direction of the tube 110 according to the insertion of the tool 140. In this case, the front end part 130 surrounding the imaging part 120 and the tube 110 becomes expanded.

In the case of the catheter 100 of the present invention, the second incised slit 131 is formed on the front end part 130, so that even if the restoring force of the front end part 130 is applied to the imaging part 120 and the signal wire 121, the imaging direction of the imaging part 120 is placed parallel to the direction toward which the front end of the insertion path 111 is oriented. Accordingly, the surgery/treatment subject is imaged accurately by the imaging part 120.

In the case of the catheter 100 according to the present invention, further, the guide groove 113 is concavely formed on the tube 110 to guide the signal wire 121, so that the application of the restoring force of the front end part 130 to the signal wire 12 is minimized. In specific, even if the restoring force of the front end part 130 is applied to the imaging part 120 and the signal wire 121, the imaging direction of the imaging part 120 is placed parallel to the direction toward which the front end of the insertion path 111 is oriented. Accordingly, the surgery/treatment subject is imaged accurately by the imaging part 120.

If the surgery/treatment through the tool 140 are completed, the tool 140 is discharged to the outside through the insertion path 111, and the imaging part 120 is aligned in a line with the insertion path 111. In this state, the catheter 100 is discharged to the outside through the incision, and the surgery/treatment are finally completed.

While the foregoing examples are illustrative of the principle of the present invention in one or more particular applications, it will be apparent to those or ordinary skill in the art that numerous modifications in form, usage, and details of implementation can be made without the exercise of inventive faculty, and without departing from the principles and concepts of the invention. Accordingly, it is not intended that the invention be limited, except as by the claims set forth below.

EXPLANATIONS OF REFERENCE NUMERALS

100: Catheter
110: Tube
111: Insertion path
112; 112a, 112b: First incised slit
113: Guide groove
120: Imaging part
121: Signal wire
130: Front end part
131: Second incised slit
140: Tool
150: Support part

INDUSTRIAL AVAILABLE APPLICABILITY

According to the present invention, the guide groove for guiding the signal wire is formed to minimize the application of the restoring force of the front end part to the signal wire, so that even if the tool is inserted, the imaging direction of the imaging part is placed parallel to the direction toward which the front end of the insertion path is oriented, which is useful in industrial fields.

The invention claimed is:

1. A catheter comprising:
   a tube having an insertion path passing therethrough in a longitudinal direction thereof and one or more first incised slits extending by a given length from the front end side thereof toward the rear end side thereof;
   an imaging part placed on top of the tube between the one or more first incised slits and aligned in a line with the insertion path on the front end of the insertion path;
   a front end part made of a flexible material and adapted to surround the outer peripheries of the front ends of the imaging part and the tube; and
   a tool inserted into the insertion path,
   wherein the front end part comprises a second incised slit formed at a position distant by a given distance from the front end side thereof toward the rear end side thereof and extending in a width direction thereof.

2. The catheter according to claim 1, wherein the tube comprises first incised slits as one or more first incised slits, and the first incised slits are spaced apart from each other by a given angle along the circumferential direction of the tube with respect to a top center axis of the cross section of the tube.

3. The catheter according to claim 1, wherein the given distance of the second incised slit distant from the front end side of the front end part is proportional to a length of the imaging part.

4. The catheter according to claim 3, wherein the given distance of the second incised slit distant from the front end side of the front end part is equal to or longer than the length of the imaging part.

5. The catheter according to claim 4, further comprising a signal wire extending from the rear end side of the imaging part in the longitudinal direction of the tube to supply the power for operating the imaging part and a guide groove concavely formed on top of the tube between the one or more first incised slits, on which the imaging part is placed, to extend in the longitudinal direction of the tube.

6. The catheter according to claim 5, further comprising a support part located between the top of the tube on which the imaging part is placed and the imaging part to support the imaging part.

7. The catheter according to claim 5, wherein the insertion path and the imaging part are placed on the same line in a horizontal direction with respect to each other, and if the tool is inserted into the insertion path, the imaging part moves in a vertical direction with respect to the horizontal direction through the tool, so that the imaging part and the insertion path are placed parallel to each other in a diameter direction of the tube.

8. The catheter according to claim 7, wherein if the tool is inserted into the insertion path, the imaging part and the insertion path are placed parallel to each other in the diameter direction of the tube, while the direction toward which the imaging part is oriented is being parallel to the direction toward which the front end of the insertion path is oriented.

* * * * *